United States Patent
Mashimo

(10) Patent No.: US 7,355,947 B2
(45) Date of Patent: Apr. 8, 2008

(54) OPTICAL DISK DEVICE AND OPTICAL DISK

(75) Inventor: Akira Mashimo, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 611 days.

(21) Appl. No.: 11/078,950

(22) Filed: Mar. 9, 2005

(65) Prior Publication Data

US 2005/0201232 A1    Sep. 15, 2005

(30) Foreign Application Priority Data

Mar. 9, 2004    (JP)    .............. 2004-065373
Mar. 9, 2004    (JP)    .............. 2004-065378

(51) Int. Cl.
G11B 20/18    (2006.01)
G11B 7/24    (2006.01)

(52) U.S. Cl. .............. 369/53.35; 369/275.4; 369/47.1

(58) Field of Classification Search ........... None
See application file for complete search history.

(56) References Cited

U.S. PATENT DOCUMENTS

| | | | |
|---|---|---|---|
| 6,233,219 B1 | 5/2001 | Hori et al. | |
| 6,400,653 B1* | 6/2002 | Torazawa et al. | 369/47.48 |
| 6,621,772 B2* | 9/2003 | Asano et al. | 369/47.22 |
| 6,630,219 B2* | 10/2003 | Hirokane et al. | 369/275.4 |
| 6,690,641 B2 | 2/2004 | Miyamoto et al. | |
| 6,791,921 B2* | 9/2004 | Maeda et al. | 369/47.28 |
| 6,914,856 B2* | 7/2005 | Kim et al. | 369/275.3 |
| 2005/0018565 A1* | 1/2005 | Kanaoka | 369/47.22 |
| 2005/0169159 A1* | 8/2005 | Tamura et al. | 369/275.3 |

FOREIGN PATENT DOCUMENTS

| | | |
|---|---|---|
| JP | 2003-30853 A | 1/2003 |
| WO | WO 98/54703 A1 | 3/1998 |

OTHER PUBLICATIONS

"Next Generation DVD Specification HD DVD", Nikkei Electronics / Nikkei BP, Oct. 13, 2003, pp. 126-134 (with partial English translation).

* cited by examiner

*Primary Examiner*—Thang V. Tran
(74) *Attorney, Agent, or Firm*—Christensen O'Connor Johnson Kindness PLLC

(57) ABSTRACT

In an optical disk of HD-DVD, data is recorded in both grooves and lands. A groove track includes its own data region called a groove (G) track address system formed therein and a land track includes its own data region called a land (L) track address system formed therein. When tracing a groove track, address information X is read from the G track address system, and also address information Y is read from the L track address system. If neither relationship X=Y or X=Y+1 is satisfied, it is determined that the address information X includes an error. Further, a groove track includes its own data region called a groove (G) track address system having a parity bit formed therein and a land track includes its own data region called a land (L) track address system having a parity bit formed therein. When tracing a groove track, address information X is read from the G track address system, and also address information Y is read from the L track address system. Even when the parity is correct, if neither relationship X=Y or X=Y+1 is satisfied, it is determined that the address information X includes an error.

7 Claims, 9 Drawing Sheets

|  | G TRACK ADDRESS SYSTEM | L TRACK ADDRESS SYSTEM |
|---|---|---|
| LAND N−1 | Y | LAND N−1 |
| GROOVE N | GROOVE N=X | Y |
| LAND N | Y | LAND N=X |
| GROOVE N+1 | GROOVE N+1 | |

Fig. 2

OPTICAL DISK DEVICE AND OPTICAL DISK

BACKGROUND OF THE INVENTION

1. Field of the Invention

The present invention relates to an optical disk device, and more particularly to a high-definition optical disk device which uses grooves and lands for data recording and reproducing.

2. Description of Related Art

HD (High-Definition) DVDs have been proposed in recent years as next generation DVDs. It is intended that the HD-DVDs adopt the disk structure of the current DVDs so as to ensure compatibility therewith, while simultaneously achieving higher density data recording than that of previous generation DVDs.

As one main feature, HD-DVDs adopt the land/groove recording method in which information is recorded in both lands and grooves. Land tracks and groove tracks are formed in wobbles, in which address information is embedded. More specifically, address information is expressed using phase modulation in such a manner that a phase of 0 degree indicates "0" and a phase of 180 degrees indicates "1". Here, for the address information to be embedded in the form of wobbles, binary data are converted into a gray code in which the distance between codes (inter-code distance) for adjacent sets of binary data, that is, the number of inverted bits, is equal to 1. Accordingly, in gray code, address "0" is represented as "00000000"; address "1" is represented as "00000001"; address "2" is repented as "00000011"; address "3" is represented as "00000010"; address "4" is represented as "00000110", and so on.

Wobbles of an HD-DVD are shown schematically in FIG. 9. In one groove track, with a combination "0" represented by wobbles in a phase of 0 degree both at the inner radius and the outer radius of the disk and "1" represented by wobbles in a phase of 180 degrees both at the inner radius and the outer radius of the disk, address information of "0001" is embedded. In the next groove track address information of "0011" is embedded in a similar manner, with a combination of "0" and "1" represented by wobbles having phases of 0 and 180 degrees, respectively. In the land track disposed between these two groove tracks, however, wobbles at the inner radius and wobbles at the outer radius become out of phase with respect to each other at the inversed bit position of the contiguous groove track (the bit position 100 in FIG. 9), where a wobble signal cannot be specified.

In order to address the above problem, HD-DVDs include respective regions where either the land track address or the groove track address are to be exclusively embedded. These regions are provided such that they are displaced from each other in the track direction, whereby the land track address and the groove track address are formed. When reading address information of a land track, the exclusive region for groove is skipped and the track address in the exclusive region for land that follows the exclusive groove region is read.

FIG. 10 schematically shows the address structure of an HD-DVD. Referring to FIG. 10, the exclusive regions for grooves and lands are indicated as "G track address systems" and "L track address systems", respectively. Each of the groove tracks and land tracks is divided into a plurality of segments in the track direction. The segment addresses are sequentially assigned for each track along circumference of the disk and are then reset for the following track. Consequently, segment 1 of groove N is adjacent to segment 1 of land N, which is then adjacent to segment 1 of groove N+1.

In the G track address system of groove N, address "N" is embedded only with wobbles which are in phase with each other (in-phase wobbles), and in the L track address system of the adjacent land N, address "N" is embedded only with in-phase wobbles. Thus, when tracing the groove track N (groove N), the segment and a wobble signal in the G track address system are reproduced. When tracing the land track N (land N), after reading the segment, the G track address system is skipped and a wobble signal in the L track address system is reproduced, thereby obtaining address information. The address structure of HD-DVDs is disclosed in "Nikkei Electronics, Oct. 13, 2003", Nikkei BP, Oct. 13, 2003, pp. 126-134.

As described above, because, for tracing land N, the G track address system is skipped and the L track address system is read, the G track address system indicated by A in FIG. 10 becomes unnecessary or a useless region. Similarly, when tracing groove N+1, because the L track address system is not used, the L track address system indicated by B in FIG. 10 becomes a useless region. While these regions include wobbles in opposite phase and provide only undetermined address information, it is desirable to effectively utilize such information.

SUMMARY OF THE INVENTION

The present invention provides an optical disk device and an optical disk in which information in L track address systems can be effectively utilized even when tracing groove tracks. The present invention also provides an optical disk device and an optical disk in which information in G track address systems can be effectively utilized even when tracing land tracks.

In one aspect of the present invention, there is provided an optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles where the phase of the wobble on the inner radius side and the phase of the wobble on the outer radius side, forming the groove, are identical and a land track address system defined by including opposite-phase wobbles where the phase of the wobble on the inner radius side and the phase of the wobble on the outer radius side, forming the groove, are reversed, the optical disk device comprising means for demodulating a wobble signal obtained by reproducing the groove track address system to obtain first groove address information X; means for demodulating a wobble signal obtained by reproducing the land track address system to obtain second groove address information Y; and means for determining an error in the first groove address information X when the second groove address information Y does not satisfy either X=Y or X=Y+1 with respect to the first groove address information X. According to the present invention, when tracing a groove, in addition to demodulation of the address information from the groove track address system, the address information is also demodulated from the land track address system which includes opposite-phase wobbles and essentially provides undetermined data, and the address information obtained from both systems is then compared. Although the address information read from the land track address system is undetermined, the address information should have a value of address of the tracks adjacent thereto on either side because the address information is coded in a gray code in which an inter-code distance is equal to 1. More specifically, the second groove address information Y obtained from the land track address system has a value which is either equal to the first groove address value X obtained from the groove track address system or is smaller than the first groove address value X obtained from the groove track address system by 1 (when the tracks are formed in the sequence of groove 1, land 1, groove 2, land 2, . . . . from the inner radius to the outer radius of a disk). Accordingly, determination is made as to whether or not the address information X and the address information Y satisfy a predetermined relationship, that is, X=Y or X=Y+1. If such a relationship is satisfied, it is determined that the address information X may be correct. If, on the other hand, such a relationship is not satisfied, it is determined that the address information X includes an error.

In accordance with another aspect of the present invention, there is provided an optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, the optical disk device comprising means for demodulating a wobble signal obtained by reproducing the land track address system to obtain first land address information X; means for demodulating a wobble signal obtained by reproducing the groove track address system to obtain second land address information Y; and means for determining an error in the first land address information X when the second land address information Y does not satisfy either the relationship X=Y or X=Y−1 with respect to the first land address information X. When tracing a land, in addition to demodulation of the address information from the land track address system, the address information is also demodulated from the groove track address system which includes opposite-phase wobbles and essentially provides undetermined data, and the address information obtained from both systems is then compared. Although the address information read from the groove track address system is undetermined, the address information should correspond to a value of the adjacent track address on either side because the address information is coded in a gray code in which an inter-code distance is equal to 1. More specifically, the second groove address information Y obtained from the groove track address system has a value which is either equal to the first land address value X obtained from the land track address system or is greater than the first land address value X obtained from the land track address system by 1 (when the tracks are formed in the sequence of groove 1, land 1, groove 2, land 2, . . . from the inner radius to the outer radius of a disk). Accordingly, determination is made as to whether or not the address information X and the address information Y satisfy a predetermined relationship, that is, X=Y or X=Y−1. If such a relationship is satisfied, there is a possibility that the address information X is correct. If, on the other hand, neither relationship is satisfied, it is determined that the address information X includes an error.

In accordance with a further aspect of the present invention, there is provided an optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the groove track address system includes a parity bit, the optical disk device comprising means for demodulating a wobble signal obtained by reproducing the groove track address system to obtain first groove address information X; means for performing parity check with respect to the first groove track address by using the parity bit; means for demodulating a wobble signal obtained by reproducing the land track address system to obtain second groove address information Y when the parity check is correct; and means for determining an error in the first groove address information X when the second groove address information Y does not satisfy either the relationship X=Y or the relationship X=Y+1 with respect to the first groove address information X. According to the present invention, when tracing a groove, the address information is obtained by demodulation of the groove track address system and parity check is performed with respect to the address information. If the parity is not correct, it can be determined that an error is present in the address information. On the other hand, even if it is determined that the parity is correct, there is a possibility that two error bits, or a greater even number of error bits, have been generated in the address information. Accordingly, in order to detect such an error when the parity is correct, in addition to demodulation of the address information from the groove track address system, the address information is also demodulated from the land track address system which includes opposite-phase wobbles and essentially provides undetermined data, and the address information obtained from both systems is then compared. Although the address information read from the land track address system is undetermined, the address information should correspond to a value of the adjacent track address on either side because the address information is coded in a gray code in which an inter-code distance is equal to 1. More specifically, the second groove address information Y obtained from the land track address system has a value which is either equal to the first groove address value X obtained from the groove track address system or is smaller than the first groove address value X obtained from the groove track address system by 1 (when the tracks are formed in the sequence of groove 1, land 1, groove 2, land 2, . . . from the inner radius to the outer radius of a disk). Accordingly, it is determined whether or not the address information X and the address information Y satisfy a predetermined relationship, that is, X=Y or X=Y+1. If such a relationship is satisfied, it is determined that the address information X is correct. If such a relationship is not satisfied, on the other hand, it is determined that the address information X includes two bits or a greater even number of bits of errors.

In accordance with a still further aspect of the present invention, there is provided an optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the land includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, and the land track address system includes a parity bit, the optical disk device comprising means for demodulating a wobble signal obtained by reproducing the land track address system to obtain first land address information X; means for performing parity check with respect to the first land track address by using the parity bit; means for demodulating a wobble signal obtained by reproducing the groove track address system to obtain second land address information Y when the parity check is correct; and means for determining an error in the first land address information X when the second land address information Y does not satisfy either the relationship X=Y or the relationship X=Y−1 with respect to the first land address information X. With the above structure, when tracing a land, the address information is obtained by demodulation of the land track address system and parity check is performed with respect to the address information. If the parity is not correct, it can be determined that an error has been caused in the address information. On the other hand, even if the parity is determined to be correct, there is a possibility that two, or a greater even number of, error bits have been generated in the address information. Accordingly, in order to detect such an error when the parity is correct, in addition to demodulation of the address information from the land track address system, the address information is also demodulated from the groove track address system which includes opposite-phase wobbles and essentially provides undetermined data, and the address information obtained from both systems is then compared. Although the address information read from the groove track address system is undetermined, the address information should correspond to a value of the adjacent track address on either side because the address information is coded in a gray code in which an inter-code distance is equal to 1. More specifically, the second land address information Y obtained from the groove track address system has a value which is either equal to the first land address value X obtained from the land track address system, or is greater than the first land address value X obtained from the groove track address system by 1 (when the tracks are formed in the sequence of groove 1, land 1, groove 2, land 2, . . . . from the inner radius to the outer radius of a disk). Accordingly, it is determined whether or not the address information X and the address information Y satisfy a predetermined relationship, that is, X=Y or X=Y−1. If such a relationship is satisfied, it is determined that the address information X is correct. If such a relationship is not satisfied, on the other hand, it is determined that the address information X includes two, or a greater even number of, error bits.

In accordance with a still further aspect of the present invention, there is provided an optical disk in which address information is embedded by forming grooves and lands in wobbles, the address information being embedded after conversion into a gray code in which a distance between codes for two consecutive address values is equal to 1, and in which data is recorded or reproduced with respect to the grooves and the lands, wherein the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, and each of the groove track address system and the land track address system includes a parity bit.

The present invention will be understood more clearly with reference to the following embodiments. It should be understood, however, that the scope of the present invention is not limited to the described embodiments.

BRIEF DESCRIPTION OF THE DRAWINGS

Preferred embodiments of the present invention will be described in detail based on the following drawings, wherein:

FIG. 2 is an explanatory view of track addresses according to the embodiment;

DETAILED DESCRIPTION OF PREFERRED EMBODIMENTS

Preferred embodiments of the present invention will be described in detail with reference to the accompanying drawings.

Figure 1:
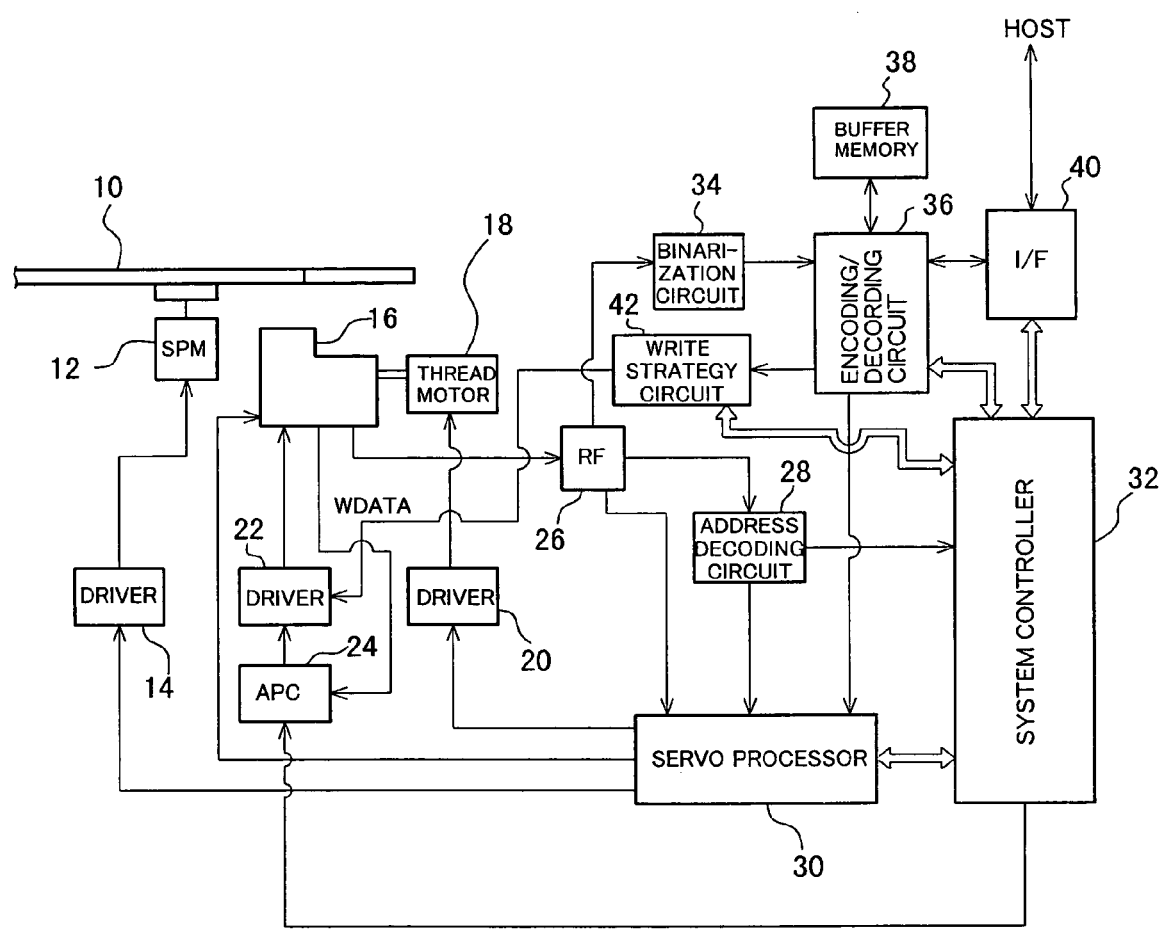
FIG. 1 is a diagram showing the overall structure of an optical disk device according to one embodiment of the present invention.

FIG. 1 shows the overall structure of an optical disk device according to the present embodiment. An optical disk 10 is rotationally driven by a spindle motor (SPM) 12. The spindle motor SPM 12 is in turn driven by a driver 14, which is servo-controlled by a servo processor 30 so as to operate at a desired rotation rate. In the present embodiment, as an example, the driver 14 divides the optical disk 10 into a plurality of zones from the inner radius to the outer radius, and drives the spindle motor SPM so as to achieve a constant angular velocity in each zone (ZCAV).

An optical pickup 16, which includes a laser diode (LD) for irradiating laser light onto the optical disk 10 and a photo detector (PD) for receiving and converting light reflected from the optical disk 10 into an electric signal, is disposed opposite the optical disk 10. The optical pickup 16 is driven by a thread motor 18 in the radial direction of the optical disk 10. The thread motor 18 is driven by a driver 20, which is servo controlled by the servo processor 30 in the same manner as the driver 14. Further, the LD of the optical pick-up 16 is driven by the driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power stepwise, and then the test data is reproduced for evaluation of the signal quality, so that the recording power with which the desirable signal quality can be obtained is selected. As an index of signal quality, a $\beta$ value and a $\gamma$ value, a degree of modulation, jitter, or the like is used.

When reproducing the data recorded on the optical disk 10, laser light of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions.

The optical pickup 16 performs recording and reproduction with respect to grooves and lands of the optical disk 10. The grooves are formed helically on the optical disk 10. Data is recorded and reproduced with regard to grooves and lands alternately, in the sequence of groove 1→land 1→groove 2→land 2→groove 3→land 3→ . . . , for example. Alternatively, it is also possible that, for each zone, recording and reproduction be performed with respect to all the grooves within the zone, and that recording and reproduction then be performed with respect to all the lands within the same zone. Thus, for each zone, recording and reproduction is performed with respect to the lands after recording and reproduction is performed with respect to the grooves. Further, the RF circuit 26 supplies an address signal (a wobble signal) contained in the reproduction signal to an address decode circuit 28. The address decode circuit 28 demodulates the address signal to obtain the address data of the optical disk 10, and supplies the demodulation data to the servo processor 30 and a system controller 32. The address data is embedded in the grooves and lands of the optical disk 10 in the form of wobbles. The optical disk 10 includes a segment address and a track address as the address data. The address data is formed on the optical disk 10 in a gray code.

The address format of the optical disk 10 is constituted by two address systems, as described above. One of the address systems detects a groove track address exclusively (which system will therefore be referred to as "groove (G) track address system"), while the other address system detects a land track address exclusively (which system will therefore be referred to as "land (L) track address system"). Both the G track address system and the L track address system are formed in groove tracks along the track direction. Similarly, both the G track address system and the L track address system are formed in land tracks along the track direction. The address can be detected from a wobble signal contained in a reproduced signal in the G track address system of the groove track and in the L track address system of the land track where wobbles are always adjusted in phase with each other.

The RF circuit 26 supplies a reproduction RF signal to a binarization circuit 34. The binarization circuit 34 binarizes (digitizes into binary data) the reproduced signal and supplies the resulting signal to an encode/decode circuit 36. The binary signal is then subjected to demodulation and error correction in the encode/decode circuit 36 to obtain reproduction data, which is output to a host device, such as a personal computer, via an interface I/F 40. Here, the encode/decode circuit 36 temporarily stores the reproduction data in a buffer memory 38 before outputting the reproduction data to the host device.

On the other hand, for recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as modulation data (ETM (Eight to Twelve Modulation) data), to a write strategy circuit 42. The write strategy circuit 42 converts the modulation data into multi-pulses (a pulse train) in accordance with a predetermined recording strategy, and supplies the multi-pulses, as recording data, to the driver 22. The recording strategy is constituted by pulse widths of a leading pulse or subsequent pulses in multi-pulses and the pulse duty, for example. The recording strategy, which affects recording quality, is generally fixed to a certain optimum strategy, and may be set during optimum power control (OPC). Then, the laser light whose power has been modulated according to the recording data is emitted from the LD of the optical pickup 16 onto the optical disk 10 for recording the data. After the data is recorded as described above, the optical pickup 16 emits laser light of reproducing power so as to reproduce the recorded data, and outputs the reproduced data to the RF circuit 26. The RF circuit 26 supplies the reproduction signal to the binarization circuit 34 where the data is binarized and supplied to the encode/decode circuit 36. The encode/decode circuit 36 decodes the modulation data and verifies the thus-decoded data against the recording data stored in the buffer memory 38. The result of verification is supplied to the system controller 32, which determines, in accordance with the verification result, whether to continue data recording or perform an alternation operation.

With the structure as described above, when detecting a groove address so as to record or reproduce data with respect to grooves, the groove (G) track address system formed in the grooves can be detected successfully, but the land (L) track address system formed by including wobbles in opposite phases cannot be detected (NG). According to the present embodiment, these L track address systems which thus result in NG are also used to detect the land address, so that an effective use can be made of the information which has heretofore not been used. More specifically, the address is detected from the L track address system which essentially provides undetermined data, and the address thus detected and the groove address detected from the G track address system is compared so as to verify the groove address.

Similarly, when tracing a land track for address detection so as to record or reproduce data with respect to lands, in addition of detection of the land address from the land (L) track address system formed in the lands, the address is also detected from the G track address system formed by including wobbles in opposite phases. Then, the address thus detected from the G track address system and the land address detected from the L track address system is compared so as to verify the land address.

FIG. 2 schematically shows an address detection operation according to the present embodiment. It is assumed that tracks are formed in the sequence of land N−1, groove N, land N, and groove N+1, . . . from the inner radius side to the outer radius side of the optical disk 10. When groove N is to be traced, the address value (N) is read from the G track address system and this address value is determined as address X. At this point, it is not known whether or not the address X is correct. Subsequently, address information of the L track address system in the same groove N is read. Here, because the L track address system includes wobbles in opposite phases, it is not possible to determine a uniquely defined address by the L track address system. However, because the address information is embedded in a gray code in which the inter-code distance is set to 1, the address information of the L track address system includes wobbles in opposite phases only at one bit position. Consequently, the address information of the L track address system of groove N should be either N−1 or N. More specifically, when the address information of the L track address system at a signal portion with such opposite-phase wobbles is read as 0, the address would be N−1. When the address information at a signal portion with such opposite-phase wobbles is read as 1, the address would be N. Thus, the address value of the L track address system can be either N or N−1, which is now determined as Y.

If the address value X which is read from the G track address system is a correct value, considering Y=N or Y=N−1, the relationship X=Y or the relationship X=Y+1 should be satisfied. On the other hand, if the address value X which is read from the G track address system is erroneous and is read as X=N−2 or X=N+2, for example, the relationship of X=Y or X=Y+1 cannot be satisfied, and an error in reading the address value X can be discovered.

However, there may be cases where the relationship can be satisfied even though the address value X read from the G track address system is incorrect. When X=N−1, for example, the relationship X=Y will be satisfied when the address read from the L track address system is Y=N−1. In such case, it is not possible to determine an error in the address value X of the G track address system. Therefore, according to the present embodiment, the reading error can be detected if the G track address system includes an error of ±2 or greater.

When land N is to be traced, on the other hand, the address value (N) is read from the L track address system and this address value is determined as address X. At this point, it is not known whether or not the address X is correct. Subsequently, address information of the G track address system in the same land N is read. Here, because the G track address system includes wobbles in opposite phases, it is not possible to determine a uniquely defined address by the G track address system. However, as the address information is embedded in a gray code in which the inter-code distance is set to 1, the address information of the G track address system includes wobbles in opposite phases only at one bit position. Consequently, the address information of the G track address system of land N should be either N or N+1. More specifically, when the address information of the G track address system at a signal portion with such opposite-phase wobbles is read as 0, the address would be N. When the address information at a signal portion with such opposite-phase wobbles is read as 1, the address would be N+1. Thus, the address value of the G track address system can be either N or N+1, which is now determined as Y.

If the address value X which is read from the L track address system is a correct value, considering Y=N or Y=N+1, either X=Y or X=Y−1 should be satisfied. On the other hand, if the address value X which is read from the L track address system is erroneous and is read as X=N−2 or X=N+2, for example, the relationship of X=Y or X=Y−1 cannot satisfied, and an error in reading the address value X can be detected.

However, there may be cases where the relationship X=Y can be satisfied even when the address value X read from the L track address system is erroneous, such as X=N+1, for example, when the address read from the G track address system is Y=N+1. In such a case, it is not possible to determine an error in the address value X of the L track address system. Therefore, according to the present invention, the reading error can be detected if the L track address system includes an error of ±2 or greater.

Figure 3:
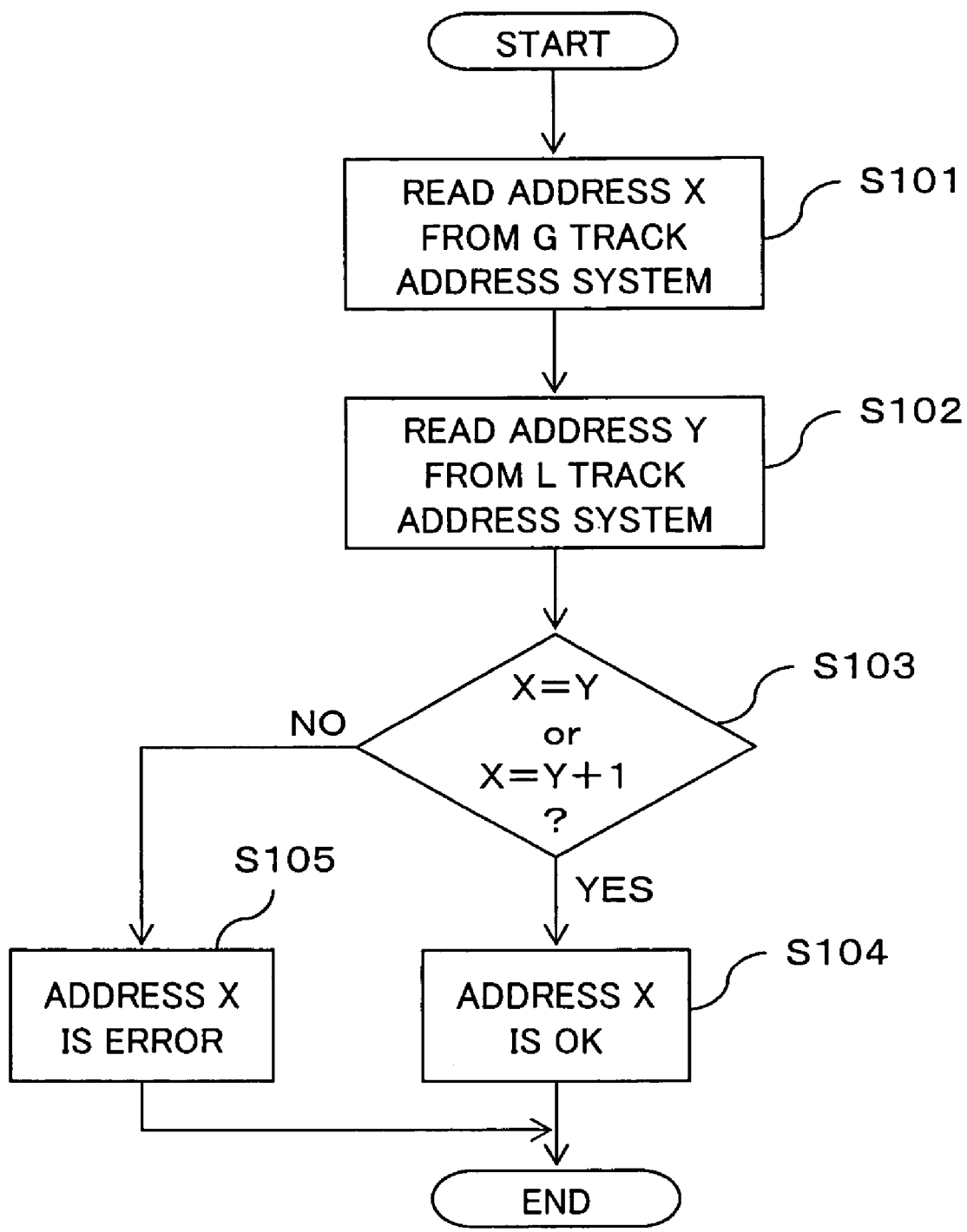
FIG. 3 is a flowchart of a process for tracing a groove track.

FIG. 3 shows a flowchart for the address information verification process when tracing a groove track.

When tracing a groove track, segment information is first obtained, and then a wobble signal is extracted from a reproduction signal of the G track address system and is demodulated, thereby obtaining the address value X (S101). More specifically, a component having a predetermined wobble frequency is extracted from the reproduction signal and the extracted data is then binarized, thereby obtaining the address information. The address value X is supplied from the address decoding circuit 28 to the system controller 32.

Then, with regard to the L track address system which is formed in the same groove track such that it is displaced from the G track address system in the track direction, a wobble signal is similarly extracted from a reproduction signal of this L track address system and is demodulated, thereby obtaining the address value Y (S102). Although the L track address system includes wobbles in opposite phases and the data value is undetermined at the portion of such opposite-phase wobbles, the data is binarized using a threshold and is forcedly read as data 0 or 1. The address value Y is then supplied from the address decoding circuit 28 to the system controller 32.

After the address values X and Y are obtained from the G track address system and the L track address system, respectively, the system controller 32 determines whether or not the address values X and Y satisfy a predetermined relationship, i.e., X=Y or X=Y+1 (S103). When X=N and Y=N−1, for example, it is determined that the address value X is correct and that reading of the address of the G track address system has been performed correctly, and therefore the address value X is confirmed (S104). When neither X=Y or X=Y+1 is satisfied, it is determined that the address value X is incorrect and that an error has been caused in the reading of the G track address system (S105). When it is determined that a reading error has occurred, the system controller 32 performs a predetermined error process.

Figure 4:
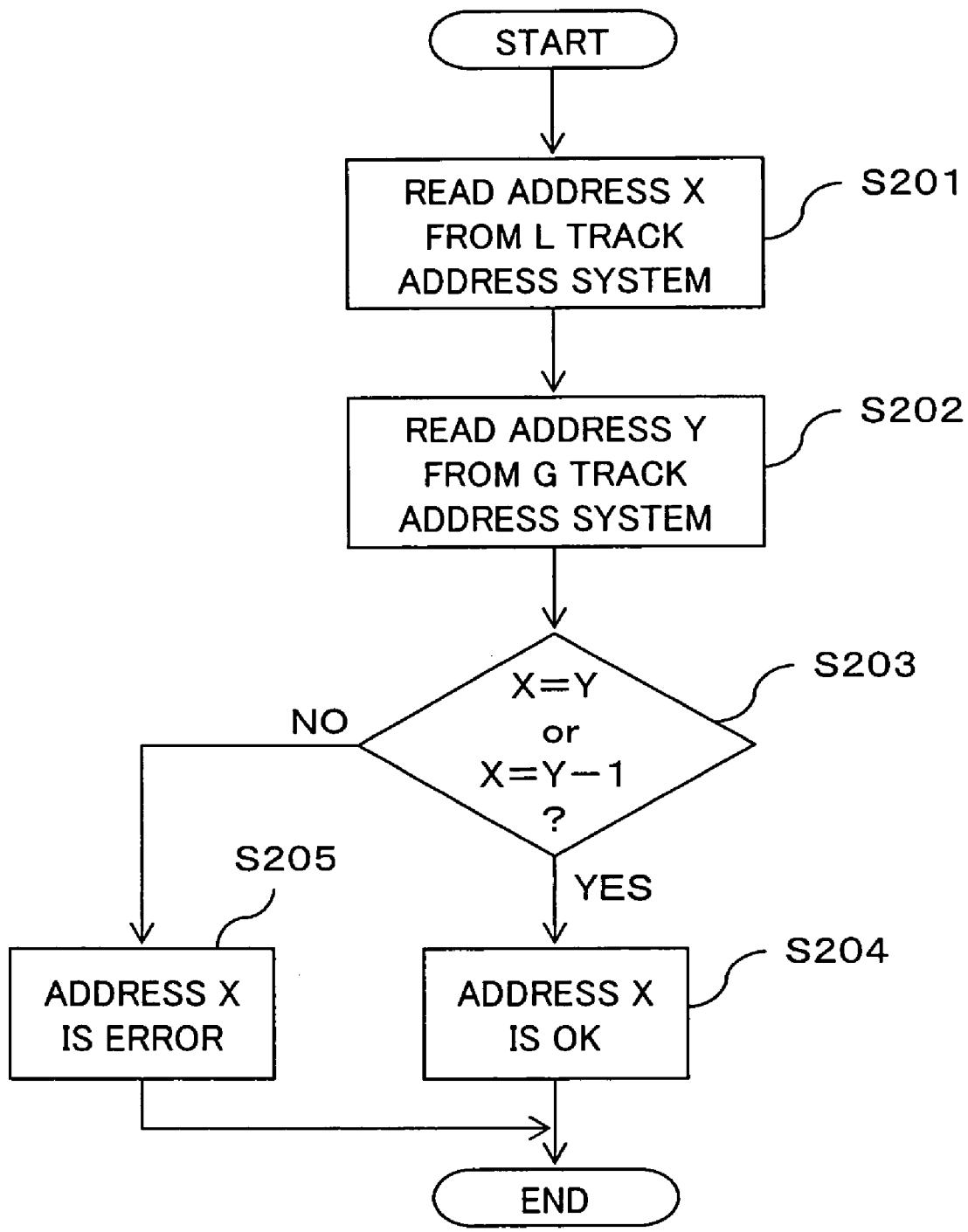
FIG. 4 is a flowchart of a process for tracing a land track.

FIG. 4 shows a flowchart for the address information verification process when tracing a land track.

When tracing a land track, segment information is first obtained, and then a wobble signal is extracted from a reproduction signal of the L track address system and is demodulated, thereby obtaining the address value X (S201). More specifically, a component having a predetermined wobble frequency is extracted from the reproduction signal and the extracted data is then binarized, thereby obtaining the address information. The address value X is supplied from the address decoding circuit 28 to the system controller 32.

Then, with regard to the G track address system which is formed in the same land track such that it is displaced from the L track address system in the track direction, a wobble signal is similarly extracted from a reproduction signal of this G track address system and is demodulated, thereby obtaining the address value Y (S202). Although the G track address system includes wobbles in opposite phases and the data value is undetermined at the portion of such opposite-phase wobbles, the data is binarized using a threshold and is forcedly read as data 0 or 1. The address value Y is then supplied from the address decoding circuit 28 to the system controller 32.

After the address values X and Y are obtained from the G track address system and the L track address system, respectively, the system controller 32 determines whether or not the address values X and Y satisfy a predetermined relationship, i.e., X=Y or X=Y−1 (S203). When X=N and Y=N+1, for example, it is determined that the address value X is correct and that reading of the address of the L track address system has been performed correctly, and therefore the address value X is confirmed (S204). When neither X=Y or X=Y−1 is satisfied, it is determined that the address value X is incorrect and that an error has been caused in the reading of the L track address system (S205). When the reading error is determined, the system controller 32 performs a predetermined error process.

As described above, according to the present embodiment, when tracing the groove track, the information of the L track address system is used to verify the address information read from the G track address system, and when tracing the land track, the information of the G track address system is used to verify the address information read from the L track address system. Accordingly, it is possible to make an effective use of the L track address system in the groove track and the G track address system in the land track, whereby accuracy and reliability of the address information can be increased.

It should be noted that when proceeding to the process shown in FIG. 3 or 4, it is necessary to determine whether the track which is now being traced is a groove track or a land track and such a determination can be made by mean of polarity of the tracking servo, for example.

It should be further noted that although in the above embodiment the system controller 32 determines whether or not the relationship of X=Y or Y=X+1 is satisfied when tracing a groove, as shown in S103 of FIG. 3, the system controller 32 may instead determine whether or not the relationship of |X−Y|≦1 is satisfied and then determine a reading error when such a relationship is not satisfied. Similarly, during the tracing of a land (S203 in FIG. 4), the system controller may determine whether or not the relationship of |X−Y|≦1 is satisfied and then determine a reading error when such a relationship is not satisfied. Further, it is also possible to determine whether or not the relationship of |X−Y|>1 is satisfied and then determine an error when such a relationship is satisfied.

Figure 5:
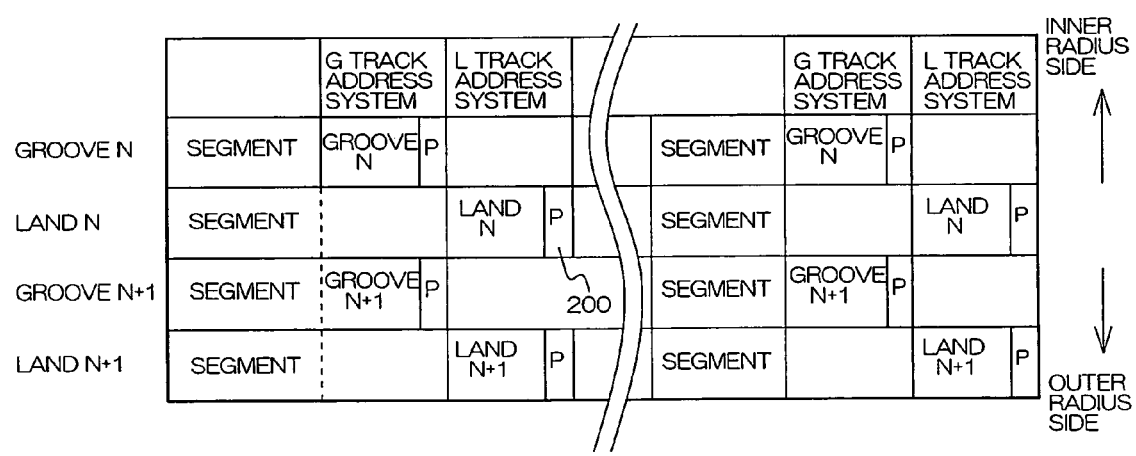
FIG. 5 is an explanatory view of track addresses according to another embodiment of the present invention.
Figure 10:
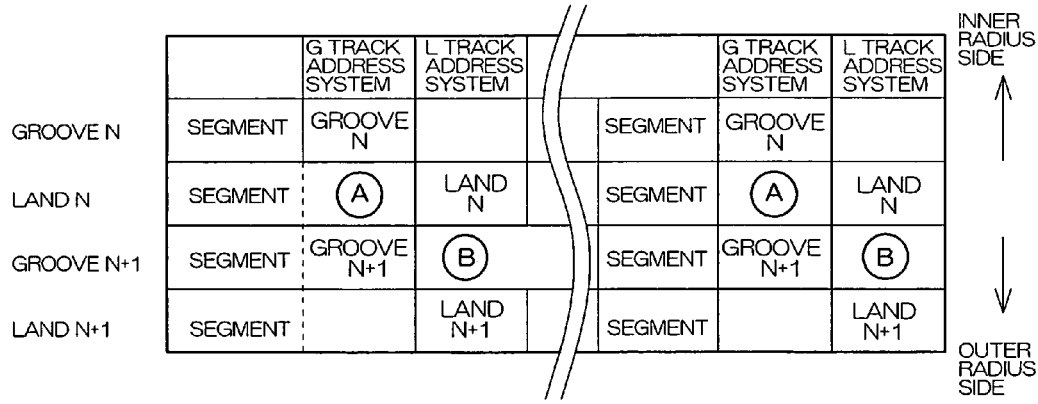
FIG. 10 is an explanatory view of track addresses of an optical disk (HD-DVD).

FIG. 5 shows an address structure according to another embodiment of the present invention. The structure in this further embodiment differs from that shown in FIG. 10 in that a parity bit 200 is added to the address of both the G track address system and the L track address system. Either odd parity or even parity may be used. An example will now be described in which even parity is adopted, and determination is made as to whether or not the number of 1's in the address data which has been read corresponds to the parity bit. When the result of this parity check is not successful or is NG, it means that the address data includes one or a greater odd number of errors. When the parity check is successful, on the other hand, the address data is correct or includes an even number of errors. Consequently, when the parity check is not correct, the system controller 32 can immediately determine a reading error. When the parity check is correct, however, it is necessary to determine whether the address data is correct or includes an even number of errors. For this reason, the address information of the L track address system is used during tracing of the grooves for verification and the address information of the G track address system is used during tracing of the lands for verification.

The L track address systems in the groove tracks and the G track address systems in the land tracks will be described.

It is now assumed that tracks are formed in the sequence of land N−1, groove N, land N, and groove N+1, . . . from the inner radius side to the outer radius side of the optical disk 10. When tracing groove N, the address value (N) is read from the G track address system and this address value is determined as address X. At this point, it is not known whether or not the address X is correct. Subsequently, address information of the L track address system in the same groove N is read. Here, because the L track address system includes wobbles in opposite phases, it is not possible to determine a uniquely defined address by the L track address systems. However, as the address information is embedded in a gray code in which the inter-code distance is set to 1, the address information of the L track address system includes wobbles in opposite phases only at one bit position. Consequently, the address information of the L track address system of groove N should be either N−1 or N. More specifically, when the address information of the L track address system at a signal portion with such opposite-phase wobbles is read as 0, the address would be N−1. When the address information at a signal portion with such opposite-phase wobbles is read as 1, the address would be N. Thus, the address value of the L track address system can be either N or N−1, which is now determined as Y.

If the address value X which is read from the G track address system is a correct value, considering the relationship Y=N or Y=N−1, either X=Y or X=Y+1 should be satisfied. On the other hand, if the address value X which is read from the G track address system is erroneous and is read as X=N−2 or X=N+2, for example, the relationship of X=Y or X=Y+1 cannot satisfied, and an error in reading the address value X can be determined.

According to this embodiment, when the address value X read from the G track address system is erroneous such as X=N−1, for example, such an error can be detected by the parity check because, in this case, the address includes one bit error.

When land N is to be traced, on the other hand, the address value (N) is read from the L track address system and this address value is determined as address X. At this point, it is not known whether or not the address X is correct. Subsequently, address information of the G track address system in the same land N is read. Here, because the G track address system includes wobbles in opposite phases, it is not possible to determine a uniquely defined address by the G track address system. However, as the address information is embedded in a gray code in which the inter-code distance is set to 1, the address information of the G track address system includes wobbles in opposite phases only at one bit position. Consequently, the address information of the G track address system of land N should be either N or N+1. More specifically, when the address information of the G track address system at a signal portion with such opposite-phase wobbles is read as 0, the address would be N. When the address information at a signal portion with such opposite-phase wobbles is read as 1, the address would be N+1. Thus, the address value of the G track address system can be either N or N+1, which is now determined as Y.

If the address value X which is read from the L track address system is a correct value, considering the relationship of Y=N or Y=N+1, either X=Y or X=Y-1 should be satisfied. On the other hand, if the address value X which is read from the L track address system is erroneous and is read as X=N-2 or X=N+2, for example, the relationship of X=Y or X=Y-1 cannot satisfied, and an error in reading the address value X can be determined.

According to this embodiment, when the address value X read from the L track address system is erroneous such as X=N+1, for example, such an error can be detected by the parity check because, in this case, the address includes one bit error.

Figure 6:
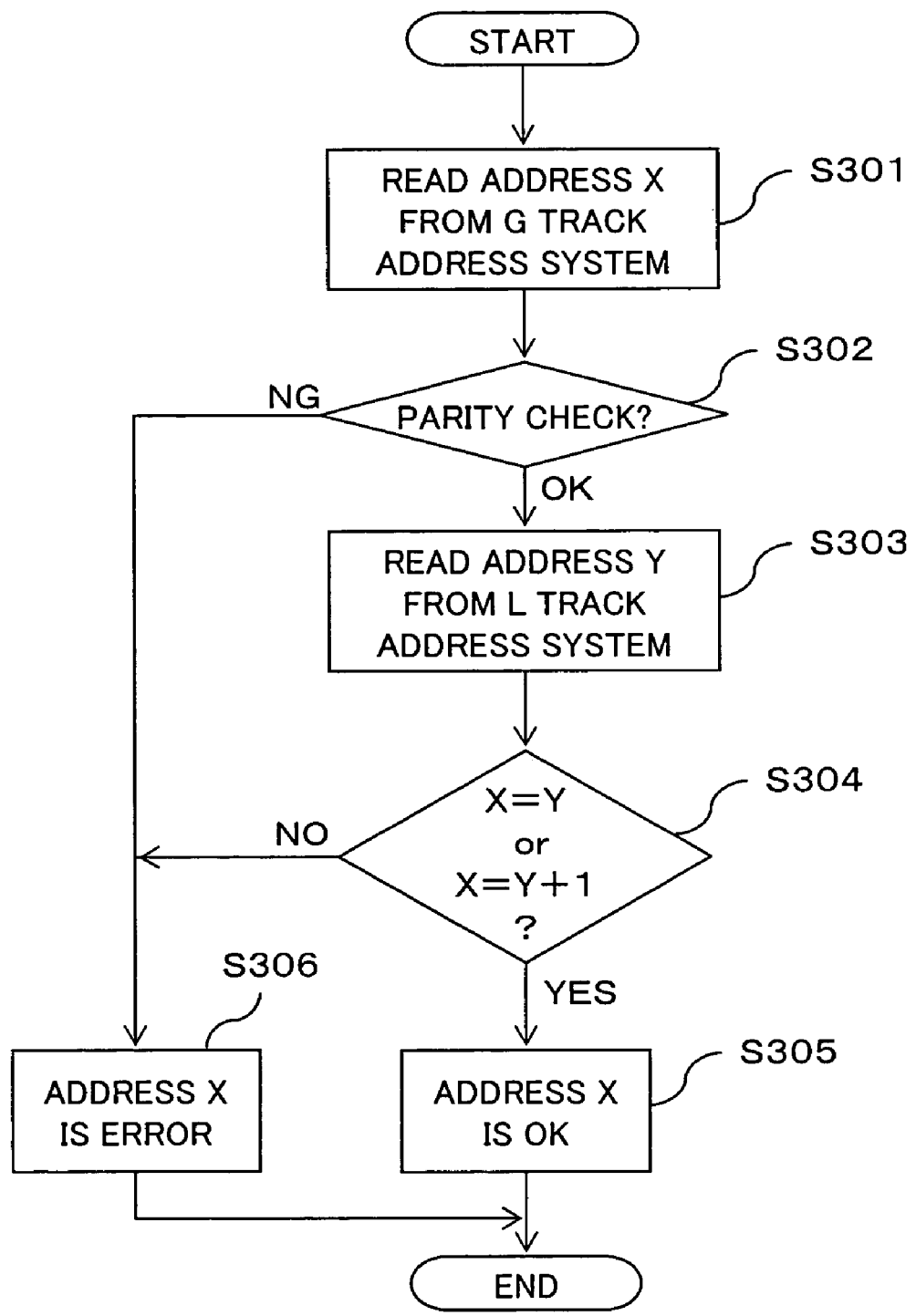
FIG. 6 is a flowchart of another process for tracing a groove track.

FIG. 6 shows a flowchart for the address information verification process when tracing a groove track.

When tracing a groove track, segment information is first obtained, and then a wobble signal is extracted from a reproduction signal of the G track address system and is demodulated, thereby obtaining the address value X (S301). More specifically, a component having a predetermined wobble frequency is extracted from the reproduction signal and the extracted data is then binarized, thereby obtaining address information. The address value X is supplied from the address decoding circuit 28 to the system controller 32.

The system controller 32 performs parity check with regard to the address value X which is thus read, and determines whether or not the parity is correct (S302). When the parity is not correct and NG is determined, it is then determined that a reading error has been caused in the address value X (S306) because the address value includes one error (or a greater odd number of errors).

On the other hand, when it is determined that the parity is correct, meaning either that no reading error has been caused and the address value X is correct or that the address value X includes two, a greater even number of, error bits. In order to specify the condition, with regard to the L track address system which is formed in the same groove track such that it is displaced from the G track address system in the track direction, a wobble signal is similarly extracted from a reproduction signal of this L track address system and is demodulated, thereby obtaining the address value Y (S303). Here, although the L track address system includes wobbles in opposite phases and the data value is therefore undetermined at the portion of such opposite-phase wobbles, the data is binarized using a threshold and is forcedly read as data 0 or 1. The address value Y is then supplied from the address decoding circuit 28 to the system controller 32.

After the address values X and Y are obtained from the G track address system and the L track address system, respectively, the system controller 32 determines whether or not the address values X and Y satisfy a predetermined relationship, i.e., X=Y or X=Y+1 (S304). When X=N and Y=N-1, for example, it is determined that the address value X is correct and that reading of the address of the G track address system has been performed correctly, and therefore the address value X is confirmed (S305). On the other hand, when neither X=Y or X=Y+1 is satisfied, it is determined that the address value X is incorrect and that errors (two, or a greater even number of, error bits) have been generated in the reading of the G track address system (S306). When it is determined that a reading error has occurred, the system controller 32 performs a predetermined error process.

Figure 7:
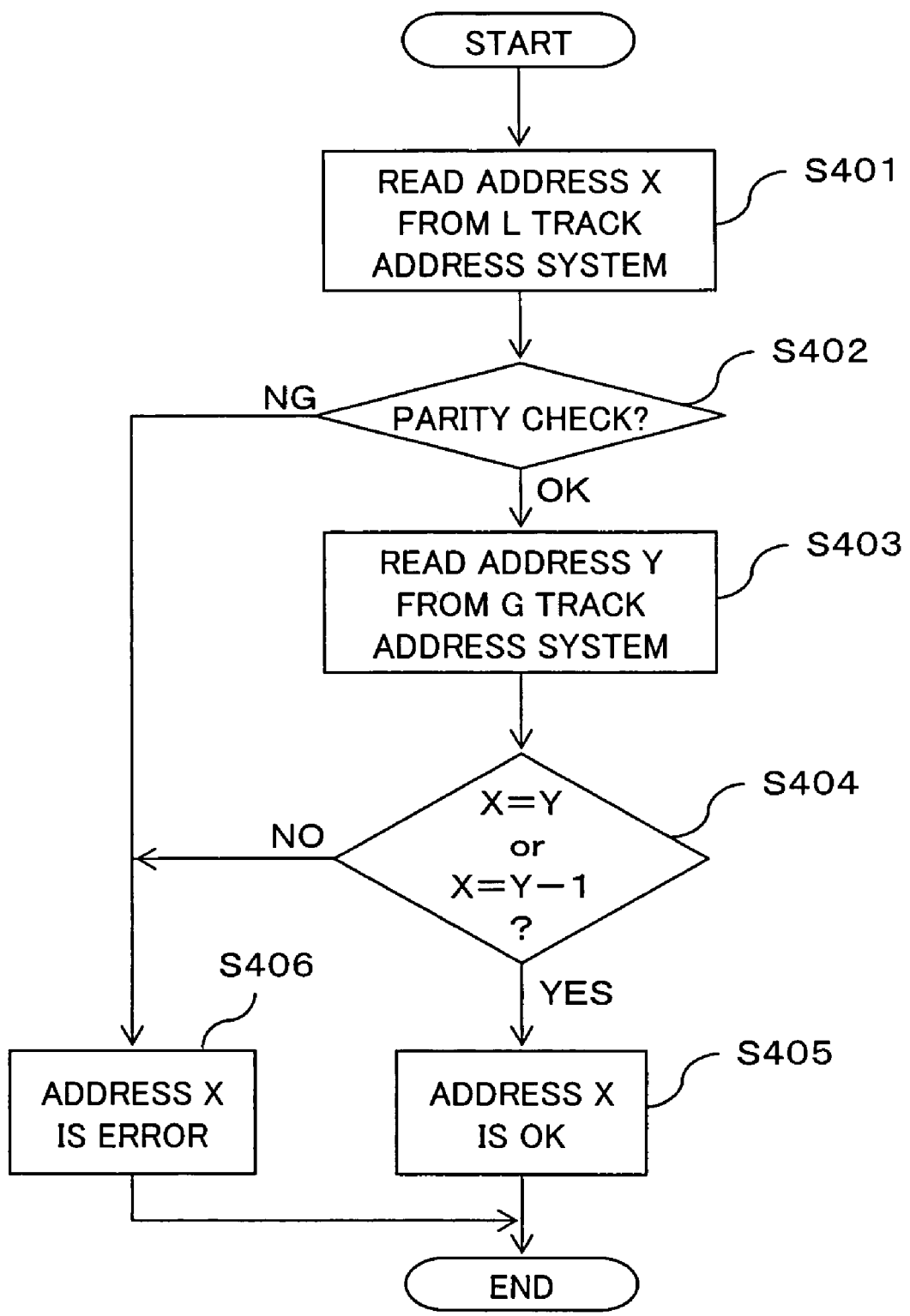
FIG. 7 is a flowchart of another process for tracing a land track.

FIG. 7 shows a flowchart for the address information verification process when tracing a land track.

When tracing a land track, segment information is first obtained, and then a wobble signal is extracted from a reproduction signal of the L track address system and is demodulated, thereby obtaining the address value X (S401). More specifically, a component having a predetermined wobble frequency is extracted from the reproduction signal and the extracted data is then binarized, thereby obtaining the address information. The address value X is supplied from the address decoding circuit 28 to the system controller 32.

The system controller 32 performs parity check with regard to the address value X which is thus read, and determines whether or not the parity is correct (S402). When the parity is not correct and NG is determined, it is then determined that a reading error has been caused in the address value X (S406) because the address value includes one error (or a greater odd number of errors).

On the other hand, when it is determined that the parity is correct, meaning either that no reading error has been caused and the address value X is correct or that the address value X includes two (or a greater even number of) error bits. In order to specify the condition, with regard to the G track address system which is formed in the same land track such that it is displaced from the L track address system in the track direction, a wobble signal is similarly extracted from a reproduction signal of this G track address system and is demodulated, thereby obtaining the address value Y (S403). Here, although the G track address system includes wobbles in opposite phases and the data value is therefore undetermined at the portion of such opposite-phase wobbles, the data is binarized using a threshold and is forcedly read as data 0 or 1. The address value Y is then supplied from the address decoding circuit 28 to the system controller 32.

After the address values X and Y are obtained from the G track address system and the L track address system, respectively, the system controller 32 determines whether or not the address values X and Y satisfy a predetermined relationship, i.e., X=Y or X=Y-1 (S404). When X=N and Y=N+1, for example, it is determined that the address value X is correct and that reading of the address of the L track address system has been performed correctly, and therefore the address value X is confirmed (S405). On the other hand, when neither X=Y or X=Y-1 is satisfied, it is then determined that the address value X is incorrect and that errors (two or a greater even number of errors) have been generated in reading of the L track address system (S406). When a reading error is detected, the system controller 32 performs a predetermined error process.

As described above, in this embodiment, for tracing a groove track, parity check is first performed using a parity bit of the G track address system and it is determined that reading error has been occurred when the parity is not correct. Even when the parity is determined to be correct, there is a possibility that an even number of errors have been generated. In order to detect such errors, verification of the address information read from the G track address system is performed using the information of the L track address system. Similarly, for tracing a land track, parity check is first performed using a parity bit of the L track address system and it is determined that reading error has been occurred when the parity is not correct. Even when the parity is determined to be correct, there is a possibility that an even number of errors are generated. In order to detect such errors, verification of the address information read from the L track address system is performed using the information of the G track address system. In this manner, an error caused when reading the address information can be reliably detected, thereby increasing reliability of the address information.

While in the above embodiment, a single parity bit is added to each of the address data of G track address system and the address data of L track address system, a "parity-parity" bit may be further added so as to check the parity bit.

Figure 8:
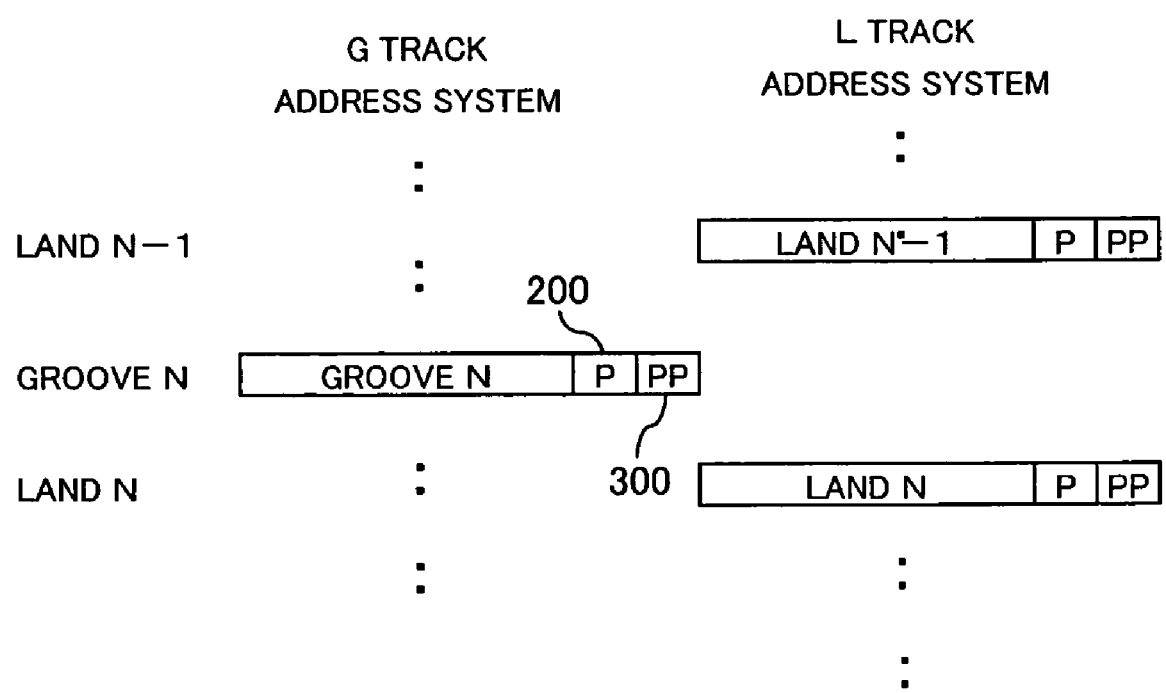
FIG. 8 is an explanatory view of track addresses according to still another embodiment of the present invention.
Figure 9:
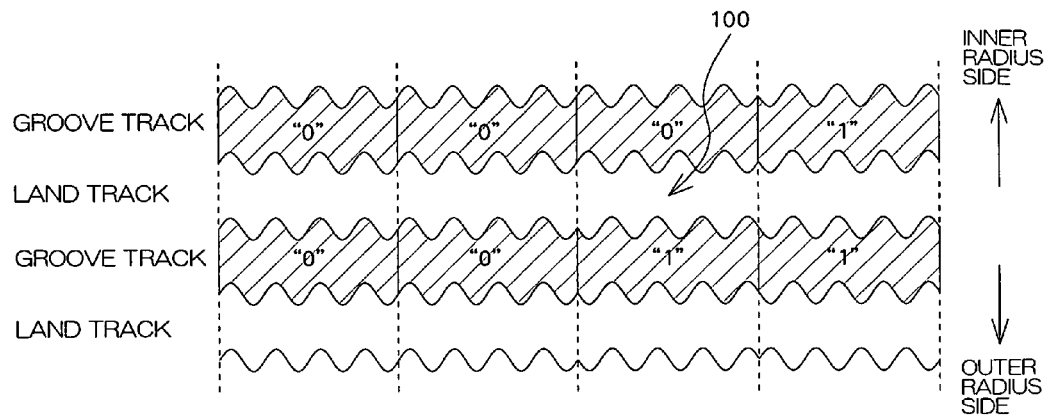
FIG. 9 is an explanatory view of wobble of an optical disk (HD-DVD)

FIG. 8 shows a data structure in which in addition to one bit of parity bit (P) 200, one bit of parity-parity bit (PP) 300 which represents the parity of the parity bit (P) 200 is further added. If both the parity (P) 200 and the parity-parity bit (PP) 300 are correct, it is determined that the address data does not include one bit, or a greater odd number of bits of, errors. Then, in the manner similar to the above-described embodiments, comparison of two address information is performed so as to determine whether or not no reading error has been occurred or an even number of errors have been generated.

Further, in the above examples, when tracing a groove, the system controller determines whether or not either relationship X=Y or X=Y+1 is satisfied as indicated by S304 of FIG. 6. However, the system controller 32 may instead determine whether or not the relationship |X−Y|≦1 is satisfied, and then determine a reading error when such a relationship is not satisfied. Similarly, when tracing a land (at step S404 in FIG. 7), the system controller 32 may determine whether or not the relationship |X−Y|≦1 is satisfied and determine a reading error when such a relationship is not satisfied. It is also possible that the system controller 32 determines whether or not the relationship |X−Y|>1 is satisfied and determine a reading error when such a relationship is satisfied.

Still further, while in the above embodiments, when the parity is correct, the address of the L track address system is read when tracing a groove and the address of the G track address system is read when tracing a land, such address information may be read prior to the parity check. More specifically, when tracing a groove, the address value X of the G track address system is read and then the address value Y of the L track address system is read. Subsequently, parity check is performed with regard to the address value X. If the parity is not correct, an error is determined. If the parity is correct, on the other hand, the address values X and Y are compared and, the address value X is determined to be correct if the relationship as indicated in step S304 of FIG. 6 is satisfied, whereas the address value X is determined to include an error if such a relationship is not satisfied.

While the preferred embodiments of the present invention have been described using specific terms, such description is for illustrative purposes only, and it is to be understood that changes and variations may be made without departing from the spirit or scope of the appended claims.

What is claimed is:

1. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles wherein the phase of the wobble on the inner radius side and the phase of the wobble on the outer radius side, forming the groove, are identical, and a land track address system defined by including opposite-phase wobbles wherein the phase of the wobble on the inner radius side and the phase of the wobble on the outer radius side, forming the groove, are reversed, the optical disk device comprising:

means for demodulating a wobble signal obtained by reproducing the groove track address system to obtain first groove address information X;

means for demodulating a wobble signal obtained by reproducing the land track address system to obtain second groove address information Y; and means for determining an error in the first groove address information X when the second groove address information Y does not satisfy either the relationship X=Y or the relationship X=Y+1 with respect to the first groove address information X.

2. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, the optical disk device comprising:

means for demodulating a wobble signal obtained by reproducing the land track address system to obtain first land address information X;

means for demodulating a wobble signal obtained by reproducing the groove track address system to obtain second land address information Y; and means for determining an error in the first land address information X when the second land address information Y does not satisfy either the relationship X=Y or the relationship X=Y−1 with respect to the first land address information X.

3. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, the optical disk device comprising:

means for demodulating a wobble signal obtained by reproducing the groove track address system when tracing a groove or demodulating a wobble signal obtained by reproducing the land track address system when tracing a land, to obtain first address information X;

means for demodulating a wobble signal obtained by reproducing the land track address system when tracing a groove or demodulating a wobble signal obtained by reproducing the groove track address system when tracing a land, to obtain second address information Y; and means for determining an error in the first address information X when the second address information Y satisfies the relationship |X−Y|≧ with respect to the first address information X.

4. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the groove track address system includes a parity bit, the optical disk device comprising:

means for demodulating a wobble signal obtained by reproducing the groove track address system to obtain first groove address information X;

means for performing parity check with respect to the first groove track address X by using the parity bit;

means for demodulating a wobble signal obtained by reproducing the land track address system to obtain second groove address information Y when the parity check is correct; and means for determining an error in the first groove address information X when the second groove address information Y does not satisfy either the relationship X=Y or the relationship X=Y+1 with respect to the first groove address information X.

5. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the land includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, and the land track address system includes a parity bit, the optical disk device comprising:

means for demodulating a wobble signal obtained by reproducing the land track address system to obtain first land address information X;

means for performing parity check with respect to the first land track address X by using the parity bit;

means for demodulating a wobble signal obtained by reproducing the groove track address system to obtain second land address information Y when the parity check is correct; and means for determining an error in the first land address information X when the second land address information Y does not satisfy either the relationship X=Y or the relationship X=Y−1 with respect to the first land address information X.

6. An optical disk device for recording and reproducing data with respect to grooves and lands of an optical disk in which address information is embedded by forming the grooves and the lands in wobbles, the address information being embedded after conversion into a gray code in which a distance between codes for two consecutive address values is equal to 1, in which the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, and each of the groove track address system and the land track address system includes a parity bit, the optical disk device comprising:

means for demodulating a wobble signal obtained by reproducing the groove track address system when tracing a groove or demodulating a wobble signal obtained by reproducing the land track address system when tracing a land, to obtain first address information X;

means for performing parity check with respect to the first address information X by using the parity bit;

means for demodulating a wobble signal obtained by reproducing the land track address system when tracing a groove or demodulating a wobble signal obtained by reproducing the groove track address system when tracing a land, to obtain second address information Y, when the parity check is correct; and means for determining an error in the first address information X when the second address information Y satisfies the relationship $|X-Y| \geqq$ with respect to the first address information X.

7. An optical disk in which address information is embedded by forming grooves and lands in wobbles, the address information being embedded after conversion into a gray code in which a distance between codes for two consecutive address values is equal to 1, and in which data is recorded or reproduced with respect to the grooves and the lands, wherein the address information of the groove includes two address systems, which are a groove track address system defined by in-phase wobbles wherein the phase of the wobble on the inner radius side and the phase of the wobble on the outer radius side, forming the groove, are identical and a land track address system defined by including opposite-phase wobbles wherein the phase of the wobble on the inner radius side and the phase of the wobble on the outer radius side, forming the groove, are reversed, and the address information of the lands includes two address systems, which are a land track address system defined by in-phase wobbles wherein the phase of the wobble on the inner radius side and the phase of the wobble on the outer radius side, forming the land, are identical and a groove track address system defined by including opposite-phase wobbles wherein the phase of the wobble on the inner radius side and the phase of the wobble on the outer radius side, forming the land, are reversed, and each of the groove track address system and the land track address system includes a parity bit.

* * * * *

UNITED STATES PATENT AND TRADEMARK OFFICE
CERTIFICATE OF CORRECTION

PATENT NO. : 7,355,947 B2  
APPLICATION NO. : 11/078950  
DATED : April 8, 2008  
INVENTOR(S) : A. Mashimo Page 1 of 1

It is certified that error appears in the above-identified patent and that said Letters Patent is hereby corrected as shown below:

| COLUMN | LINE | ERROR |
|---|---|---|
| 17 (Claim 3, | 35 line 42) | "$\lvert X{-}Y \rvert \geq$" should read -- $\lvert X{-}Y \rvert > 1$ -- |
| 19 (Claim 6, | 15 line 46) | "$\lvert X{-}Y \rvert \geq$" should read -- $\lvert X{-}Y \rvert > 1$ -- |

Signed and Sealed this

Twenty-fifth Day of November, 2008

JON W. DUDAS  
*Director of the United States Patent and Trademark Office*